(12) United States Patent
Eusterwiemann

(10) Patent No.: US 12,473,014 B2
(45) Date of Patent: Nov. 18, 2025

(54) FLOOR-BOUND VEHICLE

(71) Applicant: Broetje-Automation GmbH, Rastede (DE)

(72) Inventor: Christoph Eusterwiemann, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 822 days.

(21) Appl. No.: 17/765,308

(22) PCT Filed: Sep. 15, 2020

(86) PCT No.: PCT/EP2020/075694
§ 371 (c)(1),
(2) Date: Mar. 30, 2022

(87) PCT Pub. No.: WO2021/063666
PCT Pub. Date: Apr. 8, 2021

(65) Prior Publication Data
US 2022/0363309 A1 Nov. 17, 2022

(30) Foreign Application Priority Data
Sep. 30, 2019 (DE) .................... 10 2019 126 390.5

(51) Int. Cl.
*B62D 5/04* (2006.01)
*B62D 7/04* (2006.01)

(52) U.S. Cl.
CPC ............. *B62D 5/0418* (2013.01); *B62D 7/04* (2013.01)

(58) Field of Classification Search
CPC ......... B62D 5/0418; B62D 7/026; B62D 7/04
See application file for complete search history.

(56) References Cited

U.S. PATENT DOCUMENTS 4,108,566 A * 8/1978 Jones ...................... B23B 39/26
408/234
4,529,052 A * 7/1985 Imai ......................... B62D 9/00
180/23

(Continued)

FOREIGN PATENT DOCUMENTS

CN 1918017 2/2007
CN 101927797 12/2010

(Continued)

OTHER PUBLICATIONS

"First Office Action," for Chinese Patent Application No. 202080068556.8 mailed May 27, 2023 (9 pages) English Translation Only.

(Continued)

*Primary Examiner* — Valentin Neacsu
*Assistant Examiner* — Hosam Shabara
(74) *Attorney, Agent, or Firm* — Pauly, DeVries Smith & Deffner LLC

(57) ABSTRACT

A floor-bound vehicle, in particular for a movable production plant with a processing unit for processing a workpiece, with at least two drive units, wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel, wherein for steering, the respective wheel carrier can be adjusted relative to the respective travel drive by means of the respective steering drive is provided.

22 Claims, 4 Drawing Sheets

(56) References Cited

U.S. PATENT DOCUMENTS

| | | | | |
|---|---|---|---|---|
| 4,683,973 | A | * | 8/1987 | Honjo .................. B60K 17/303 |
| | | | | 280/47.11 |
| 5,379,842 | A | | 1/1995 | Terry |
| 6,145,611 | A | * | 11/2000 | Haddad, Sr. ........... B60K 17/30 |
| | | | | 180/65.6 |
| 6,491,127 | B1 | | 12/2002 | Holmberg et al. |
| 11,072,439 | B2 | * | 7/2021 | Vance ..................... B66F 9/063 |
| 11,136,144 | B2 | * | 10/2021 | Bell .......................... B64F 5/50 |
| 11,904,934 | B2 | * | 2/2024 | Schwaiger ............. B66F 9/063 |
| 12,053,880 | B2 | * | 8/2024 | Neemann ............... B21J 15/142 |
| 2013/0226340 | A1 | * | 8/2013 | Buchstab ................. B25J 5/04 |
| | | | | 700/245 |

FOREIGN PATENT DOCUMENTS

| | | | |
|---|---|---|---|
| CN | 108819711 | | 11/2018 |
| DE | 102006022242 | | 11/2007 |
| DE | 102008014364 | | 9/2009 |
| DE | 202015101427 | | 6/2016 |
| DE | 102016210947 | | 12/2017 |
| EP | 3228525 | | 10/2017 |
| GB | 2260108 | | 4/1993 |
| JP | 2014020388 | | 2/2014 |
| WO | 2017220407 | | 12/2017 |
| WO | WO-2017220407 A1 * | 12/2017 | ............. B62D 11/20 |
| WO | 2018136987 | | 8/2018 |
| WO | 2021063666 | | 4/2021 |

OTHER PUBLICATIONS

"German Search Report," for German Patent Application No. 102019126390.5 mailed Dec. 9, 2020 (5 pages).

"International Search Report," for PCT Application No. EP/2020/075694 mailed Dec. 16, 2020 (2 pages).

* cited by examiner

FLOOR-BOUND VEHICLE

CROSS-REFERENCE TO RELATED APPLICATIONS

This application is a national stage application under 35 U.S.C. 371 of International Patent Application Serial No. PCT/EP2020/075694, entitled "FLOOR-BOUND VEHICLE," filed Sep. 15, 2020, which claims priority from German Patent Application No. DE 10 2019 126 390.5, filed Sep. 30, 2019, the disclosure of which is incorporated herein by reference.

FIELD OF THE TECHNOLOGY

The present disclosure concerns a floor-bound vehicle, in particular for a movable production plant with a processing unit for processing a workpiece, and a movable production plant for processing a workpiece, in particular a structural aircraft component.

BACKGROUND

Such floor-bound vehicles and movable production plants are known from the prior art. These floor-bound vehicles usually comprise a travel drive by means of which they can be driven to different workstations. Often, a processing robot for processing a workpiece is arranged on these floor-bound vehicles. These production plants are also known as mobile robot platforms.

For example, DE 20 2015 101 427 U1 describes such a production plant with a floor-bound vehicle on which a processing robot with a tool unit is arranged. The processing robot is here used to apply an adhesive and/or a sealant. The floor-bound vehicle is configured so as to be movable and steerable omnidirectionally. For this it has Mecanum wheels.

SUMMARY

Such floor-bound vehicles with Mecanum wheels have the disadvantage that, on uneven ground in particular, precise positioning is not possible or only possible with considerable control complexity. This applies in particular if the floor-bound vehicle has several wheels, so that individual Mecanum wheels continuously have no or only partial ground contact on one flank.

Various embodiments are based on the problem of designing and refining the known floor-bound vehicle such that good positioning accuracy and traction, also on uneven ground, are achieved in a structurally simple and economic fashion.

The above problem is achieved with a floor-bound vehicle according to the disclosure.

The floor-bound vehicle according to various embodiments, in particular for a movable production plant with a processing unit for processing a workpiece, has at least two drive units. The drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel. Here it is provided that for steering, the respective wheel carrier can be adjusted relative to the respective travel drive by means of the respective steering drive.

With this solution according to the proposal, despite the implemented steering function, there are great degrees of freedom in the suspension of the individual drive wheels. This is because a functional separation is implemented between steering and driving, which is expressed in that with the solution according to the proposal, the travel drive does not follow a possible steering movement. This functional separation in particular provides a simple possibility for springing the drive wheels, so that even on an uneven ground, a better ground contact can be created and hence the positioning accuracy of the vehicle can be increased.

For example, because of the functional separation between steering and driving, in the case of uneven ground and loss of ground contact between the drive wheel and the ground, a ground contact for the drive wheel can be created by adjustment of the wheel carrier and with it the drive wheel by means of the steering drive, in particular also in a non-targeted travel direction of the vehicle.

Various embodiments allow a particularly simple installation or removal and maintenance of the drive units.

The rotational locking according to various embodiments allows a secure transfer of force from the travel drive to the drive wheel, and a structurally particularly simple energy supply to the travel drive.

According to various embodiments, the drive wheels can be adjusted over a large steering angle about a pivot axis, giving a good turning ability. In various embodiments, because of the steering drive, the respective wheel carrier with the drive wheel is even freely adjustable, i.e. infinitely adjustable, in some embodiments, in both steering directions. As a result, a quite particularly simple and flexible control of the travel direction of the floor-bound vehicle can be achieved.

According to various embodiments, the respective drive unit may have a further wheel, whereby a larger contact area on the ground and hence a more precise positionability of the floor-bound vehicle can be achieved, in particular on uneven ground.

According to various embodiments, the respective drive unit may comprise a gear mechanism which is arranged in the drive train from the travel drive to the drive wheel, and transmits the drive power of the travel drive to the drive wheel. This may in particular be an angular gear or a reduction gear.

The pivot device described below also allows an upward springing and hence an improvement in ground contact and more precise positionability of the floor-bound vehicle on uneven ground.

According to various embodiments, during pivoting of the drive wheel and the further wheel (where fitted) about the geometric pivot axis, the travel drive is co-pivoted, and/or the steering drive is not co-pivoted. During the former variant, the load on the drive train from the travel drive to the drive wheel is reduced, while the latter variant allows a simpler energy supply to the steering drive.

Furthermore, the maximum pivot angle of the drive wheel and the further wheel (where fitted) about the geometric pivot axis may be dependent on the steering angle set by the steering drive. This in particular allows a quite particularly simple and secure torque locking with simultaneously low loads on the drive train of the travel drive.

Various embodiments provide a design for steering which in particular allows a free adjustment of the wheel carrier in a structurally simple fashion.

According to various embodiments, the vehicle can be controlled automatically and guided contactlessly. The above-mentioned flexible control of the travel direction is here of particular advantage.

The features of various embodiments allow a particularly stable stance of the vehicle while stationary. This is of particular advantage in particular during processing of a workpiece by a processing unit arranged on the vehicle.

In addition, the problem cited initially is also or alternatively solved by a floor-bound vehicle with the features as described herein.

Because the rotational axis of the drive wheel is tiltable relative to the vehicle, in particular the mounting portion, a better contact between the drive wheel and ground can be achieved even on uneven ground. In this way too, in a structurally simple and economic fashion, the positioning accuracy of the vehicle can be improved, in particular on uneven ground.

The floor-bound vehicle may have the features described in connection with the floor-bound vehicle of the first teaching, either individually or in combination. To this extent, reference is made to the statements relating thereto.

In addition, the problem cited initially is solved according to a third teaching by a movable production plant for processing a workpiece, in particular a structural aircraft component, with the features as described herein.

Because the production plant comprises a floor-bound vehicle of the type described above and a processing unit for processing the workpiece which is arranged on the vehicle, and wherein the processing unit for processing the workpiece has a tool unit, in particular a drilling and or riveting unit, a particularly simple and flexibly movable production plant is provided which can be positioned precisely even on uneven ground.

According to various embodiments, the processing unit here comprises a processing robot which carries the tool unit as the end effector. This creates a mobile robot platform which can be used particularly flexibly for the production of structural aircraft components.

Various embodiments provide a floor-bound vehicle, in particular for a movable production plant with a processing unit for processing a workpiece, with at least two drive units, wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel, wherein for steering, the respective wheel carrier can be adjusted relative to the respective travel drive by means of the respective steering drive.

In various embodiments, the respective drive unit has a mounting portion via which the drive unit, as a premounted unit, can be attached to the floor-bound vehicle and/or removed from the floor-bound vehicle.

In various embodiments, the respective travel drive is rotationally locked with respect to its geometric drive axis relative to the vehicle, in particular the mounting portion. In various embodiments, the respective rotational locking is achieved by a movably mounted rod, for which the rod engages on the travel drive and/or a fixing of the travel drive and a point which is stationary relative to the vehicle, in particular the mounting portion.

In various embodiments, the respective wheel carrier with the drive wheel is adjustable by means of the respective steering drive about the geometric steering axis through at least 270°, at least 330°, at least 360°, at least 420°, or freely.

In various embodiments, the respective drive unit has a further wheel, in particular a free-running wheel and/or a drive wheel, wherein the further wheel is arranged on the wheel carrier and wherein for steering, the wheel carrier together with the drive wheel and the further wheel is adjustable by means of the steering drive about the steering axis. In various embodiments, the rotational axis of the drive wheel and the rotational axis of the further wheel are coaxial to one another.

In various embodiments, the respective drive unit, in particular the wheel carrier, has at least one gear mechanism, in particular an angular gear and/or a reduction gear, which is arranged in the drive train from the travel drive to the drive wheel and transmits the drive power of the travel drive to the drive wheel. In various embodiments, the input shaft of a respective gear, in particular the angular gear, is arranged coaxially to the drive shaft of the travel drive, and the output shaft of the respective gear, in particular the reduction gear, is arranged coaxially to the rotational axis of the drive wheel.

In various embodiments, the respective wheel carrier has a pivot device via which the drive wheel and the further wheel (where fitted) can be pivoted about a geometric pivot axis in order to compensate for unevenness in the ground. In various embodiments, during pivoting, the rotational axis of the drive wheel and the rotational axis of the further wheel (where fitted) is/are tilted relative to the vehicle, in particular the mounting portion.

In various embodiments, during pivoting of the drive wheel and the further wheel (where fitted) about the geometric pivot axis, the travel drive is co-pivoted, and/or during pivoting of the drive wheel and the further wheel (where fitted) about the geometric pivot axis, the steering drive is not co-pivoted.

In various embodiments, the maximum pivot angle of the drive wheel and the further wheel (where fitted) about the geometric pivot axis is dependent on the steering angle set by the steering drive.

In various embodiments, the drive unit has a steering gear, and the steering drive adjusts the wheel carrier about the steering axis via the steering gear. In various embodiments, the steering gear is a toothed gear and/or toothed belt gear and/or belt gear.

In various embodiments, it is controlled automatically and guided contactlessly.

In various embodiments, the drive units are also retractable relative to the vehicle, such that the floor-bound vehicle is placed on the ground for a secure stance, and in particular the drive wheel or drive wheels no longer touches or touch the ground, and/or the floor-bound vehicle has supports for raising the floor-bound vehicle such that, in raised state of the vehicle, the drive wheel or drive wheels no longer touches or touch the ground.

Various embodiments provide a floor-bound vehicle, in particular for a movable production plant with a processing unit for processing a workpiece, with at least two drive units, wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel, wherein the rotational axis of the drive wheel is tiltable relative to the vehicle, in particular the mounting portion.

Various embodiments provide a floor-bound vehicle as described herein.

Various embodiments provide a movable production plant for processing a workpiece, in particular a structural aircraft component, wherein the production plant has a floor-bound vehicle as described herein and a processing unit for processing the workpiece and assigned to the vehicle, wherein the processing unit for processing the workpiece has a tool unit, in particular a drilling and/or riveting unit for drilling and/or riveting.

In various embodiments, the processing unit has a processing robot which carries the tool unit as the end effector. In various embodiments, the processing robot has an adjustment kinematics with at least four adjustment axes.

BRIEF DESCRIPTION OF THE DRAWINGS

Various aspects are explained in more detail below with reference to a drawing illustrating purely exemplary embodiments. The drawing shows.

DETAILED DESCRIPTION

Figure 1:
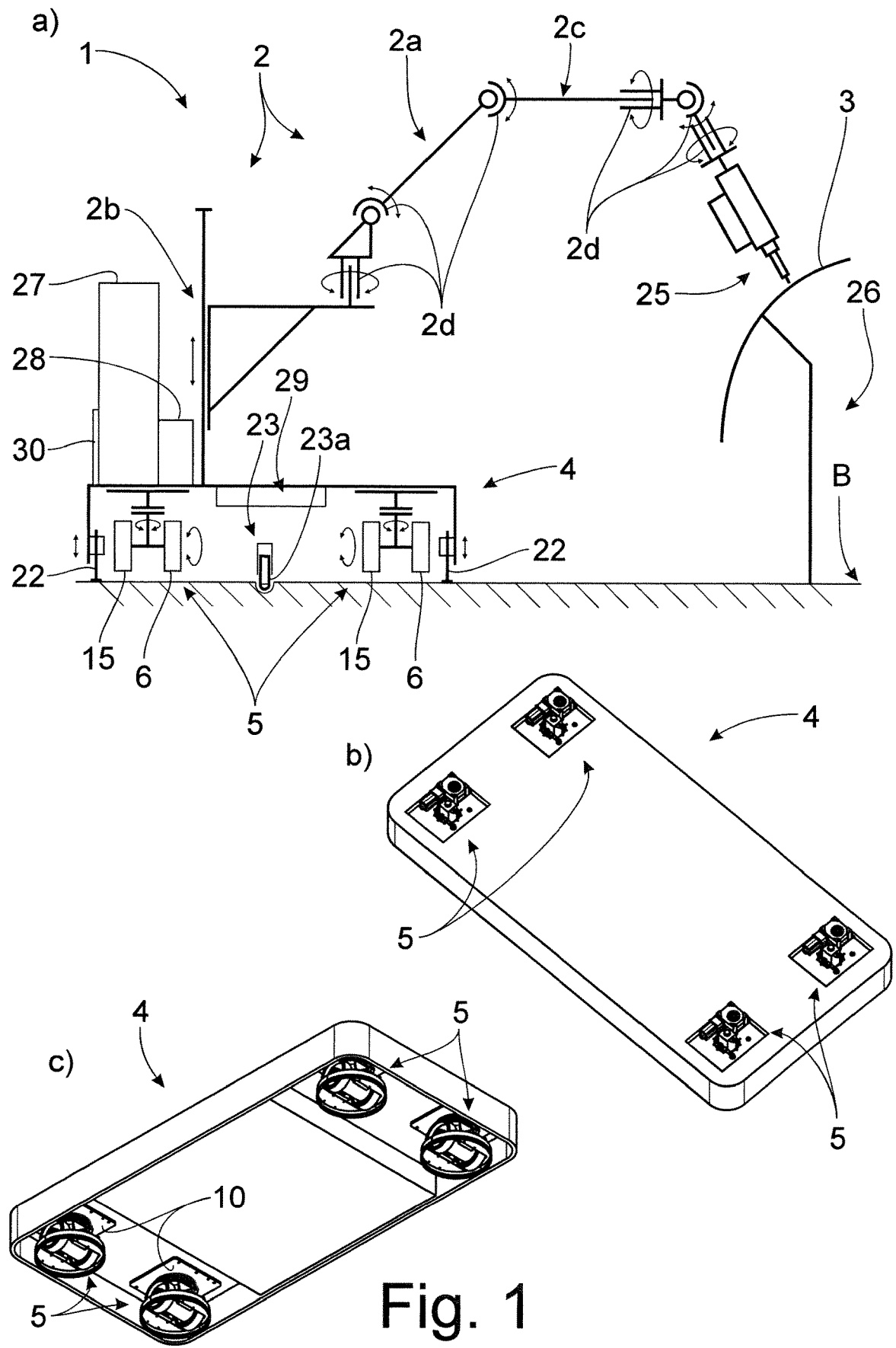
FIG. 1 a) a schematic illustration of a movable production plant according to the proposal, with a floor-bound vehicle according to the proposal, in a side view, b) a perspective view of only the floor-bound vehicle, obliquely from above, and c) a perspective view of only the floor-bound vehicle, obliquely from below, FIG. 2 a perspective view of a drive unit of the floor-bound vehicle from FIG. 1, a) obliquely from above and b) obliquely from below, FIG. 3 a sectional view of the drive unit from FIG. 2 along line III-III on an even ground, and FIG. 4 a side view of the drive unit from FIG. 2 with pivotable drive wheel on a sloping floor.

The illustration in FIG. 1 shows a movable production plant 1 according to the disclosure with a processing unit 2 for processing a workpiece 3, in particular a structural aircraft component, with a floor-bound vehicle 4 according to the proposal. In FIG. 1a, the production plant 1 is configured as a mobile robot platform. The floor-bound vehicle 4 is here a vehicle 4 which can travel freely on the floor, i.e. in particular a vehicle which is independent of rails.

This type of production plant 1, in particular a mobile robot platform, is of particular importance in the processing of structural aircraft components, in particular fuselage portions and/or wing portions, because of the size of these components and the accuracy requirements applicable thereto.

Before discussing the movable production plant 1 according to the proposal, firstly the floor-bound vehicle 4 and the drive unit 5 will be described.

Figure 2:
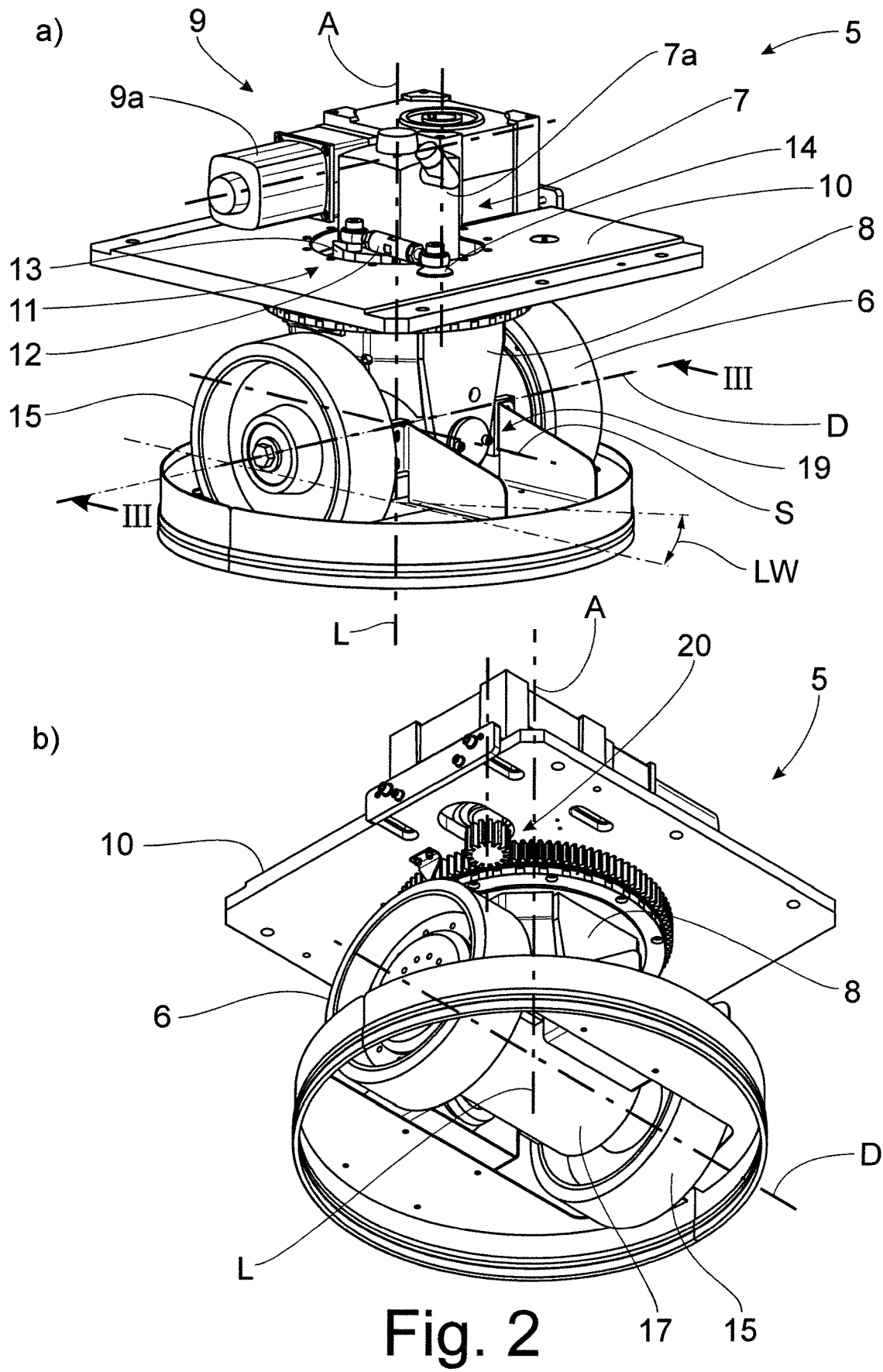

The floor-bound vehicle 4 according to the proposal has at least two drive units 5. As FIG. 2 shows for a single drive unit 5, each drive unit 5 comprises at least one drive wheel 6, a travel drive 7 for driving the at least one drive wheel 6, a wheel carrier 5 on which the at least one drive wheel 6 is arranged, and a steering drive 6 for adjusting the wheel carrier 8 with the drive wheel 6 about a geometric steering axis L and thus steering the drive wheel 6. The steering axis L is here oriented substantially vertically, i.e. perpendicularly to the ground.

The travel drive 7 here has a travel drive motor 7a which can be an electric motor. The steering drive 9 here also has a steering drive motor 9a which can be an electric motor.

In order to achieve maximum positioning accuracy, in particular in the case of uneven ground, in a floor-bound vehicle 4 according to a first teaching, for steering, the respective wheel carrier 8 can be adjusted relative to the respective travel drive 7 by means of the respective steering drive 6. This adjustability, in particular on uneven ground, allows a particularly good ground contact during travelling and steering and hence a particularly high positioning accuracy.

In the exemplary embodiment illustrated, the vehicle 4 is configured so as to be movable and steerable omnidirectionally. This is achieved in that the wheels are provided by the steerable drive units 5. In various embodiments, all wheels are provided by the steerable drive units 5. Alternatively however, separate wheel units (not shown) with wheels may be provided which have no driven wheels.

The direction in which the vehicle 4 is to be steered can be set freely in the exemplary embodiment illustrated by corresponding activation of the drive units 5. For this, here, each individual drive unit 5 is actuated individually, so that the steering angle LW of each drive unit 5 can be set independently of the respective other drive units 5.

The drive units 5 of a floor-bound vehicle 4 according to the proposal are here structured identically. In particular, they may also be oriented in the same way and/or be arranged symmetrically on the vehicle 4.

As FIG. 2 shows, the drive unit 5 has a mounting portion 10. Via the mounting portion 10, the drive unit 5 as a pre-assembled unit may be attached to the floor-bound vehicle 4 and/or removed from the floor-bound vehicle 4. This allows the floor-bound vehicle 4 to be fitted with the drive units 5a in a particularly simple fashion. In the exemplary embodiment, four drive units 5 are provided. As already mentioned, in addition wheel units (not shown) may be provided which do not have any driven wheels. Here however, all wheel units are configured as drive units 5, as will be explained below.

The travel drive 7 is rotationally locked with respect to a geometric drive axis A relative to the vehicle 4, in particular the mounting portion 10. This allows a quite particularly simple energy supply to the travel drive 7 from the vehicle 4, in particular without the need for slip rings and/or cable carriers. The power supply to the travel drive 7 from the vehicle 4 is here designed without slip rings and/or cable carriers. This is possible since the travel drive 7 is not co-carried by the wheel carrier 8 and drive wheel 6.

The drive axis A means the rotational axis of the drive shaft 7b of the travel drive 7, here the rotational axis of the motor shaft of the travel drive motor 7a.

In the exemplary embodiment shown in FIG. 2a), the rotational locking 11 is achieved by means of a movably mounted rod 12. The rod 12 may act on the travel drive 7 and/or a fixing 13 of the travel drive 7, and on a point 14 which is stationary relative to the vehicle, in particular the mounting portion 10 of the respective drive unit 5. In various embodiments, the rotational locking 11 allows the travel drive 7 a movement play in at least in one direction. This is discussed in more detail below with reference to the pivot axis S.

The connection to the travel drive 7 or a fixing 13 of the travel drive 7 and/or the point 14 which is stationary relative to the vehicle, in particular the mounting portion 10, here takes place in particular via a respective ball joint 15.

In the exemplary embodiment illustrated, the wheel carrier 8 of the drive unit 5 with the drive wheel 6 is freely adjustable by means of the steering drive 9 about a geometric steering axis L. This allows an implementation and control of the steering movements of the vehicle 5 which are particularly simple in terms of control technology. In the exemplary embodiment, this allows inter alia the unidirectional movability and steerability of the vehicle 4.

It may however also be provided that the wheel carrier 8 with the drive wheel 6 can be adjusted by means of the steering drive 9 about a geometric steering axis L only through at least 270°, further at least 330°, further at least 360°, or further at least 420°.

In order to further increase the positioning accuracy of the vehicle 4 on uneven ground B, here it is provided that the drive unit 5 has a further wheel 15, in particular a free-running wheel and/or a drive wheel. In the exemplary embodiment illustrated, the further wheel 15 is a free-running wheel. The drive unit 5 here therefore has only one drive wheel 6. Thus no differential is required in the drive unit 5. The further wheel 15 is arranged on the wheel carrier 8.

For steering, here the wheel carrier 8 together with the drive wheel 6 and the further wheel 15 is adjusted by means of the steering drive 9 about the steering axis L. This is evident from the sectional illustration in FIG. 3. As FIG. 3 further shows, the rotational axes D of the drive wheel 6 and further wheel 15 of a drive unit 5 are arranged coaxially to one another. The rotational axis D runs substantially parallel to the ground B.

In the exemplary embodiment shown, the rotational axis D of the drive wheel 6, and the rotational axis D of the further wheel D (where fitted), intersects with the steering axis L. The wheel carrier 8 here forms a double wheel arrangement together with the drive wheel 6 and further wheel 15. Here, each drive unit 5 has such a double wheel arrangement. Furthermore, the drive wheel 6 and/or the further wheel 15 are here arranged on the wheel carrier offset relative to the steering axis L, such as with substantially the same distance from the steering axis L, so that the steering axis does not intersect the drive wheel 6 and/or the further wheel 15.

Figure 3:
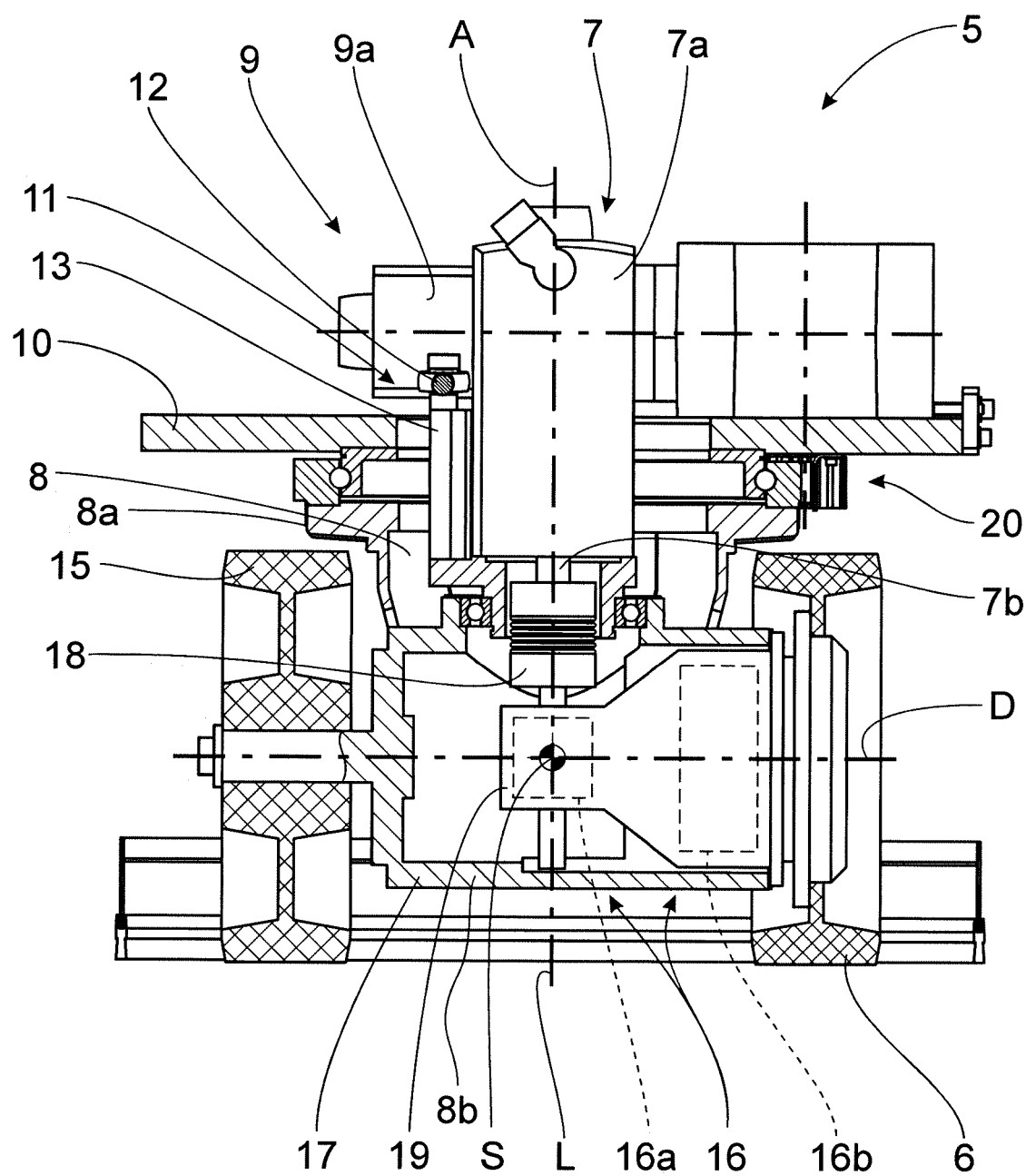

As FIG. 3 shows, the drive unit 5, in particular the wheel carrier 8, has at least one gear mechanism 16. Here, the drive unit 5, in particular the wheel carrier 8, comprises an angular gear 16a and/or a reduction gear 16b. The gear(s) 16, 16a, 16b are arranged in the drive train 17 from the travel drive 7 to the drive wheel 6, which ensures a transmission of drive power from the travel drive 7 to the drive wheel 6. In the exemplary embodiment illustrated, the input shaft 16c of the angular gear 16a is arranged coaxially to the drive shaft 7b of the travel drive 7. The drive shaft and input shaft are connected together via a coupling 18, in particular a bellows-type coupling. The output shaft of the reduction gear 16b is arranged coaxially to the rotational axis D of the drive wheel 6. The arrangement of the input shaft of the angular gear 16a relative to the drive shaft 7b of the travel drive 7 allows the adjustment of the wheel carrier 8 about the pivot axis S relative to the travel drive 7. In the exemplary embodiment illustrated, the gear mechanism 16 is configured such that an adjustment of the wheel carrier 8 by means of the steering drive 9 automatically also causes a rotation of the drive wheel 5.

Furthermore, as shown in FIGS. 2 and 3, the wheel carrier 8 has a pivot device 19 via which the drive wheel 6 and the further wheel 15 (where fitted) can be pivoted about a geometric pivot axis S in order to compensate for unevenness in the ground B. This in particular allows an above-mentioned springing to compensate for the unevenness. In the exemplary embodiment illustrated, as a result, the rotational axis D of the drive wheel 6 is tiltable relative to the vehicle 4, in particular relative to the mounting portion. The term "springing" here means a movement of the drive wheel 6 and/or any further wheel 15 present towards the vehicle 4. This movement need not necessarily take place against the spring force of a spring, and nor is this the case in the exemplary embodiment. However, a spring may be provided which counters the pivot movement, in particular the tilt movement.

Figure 4:
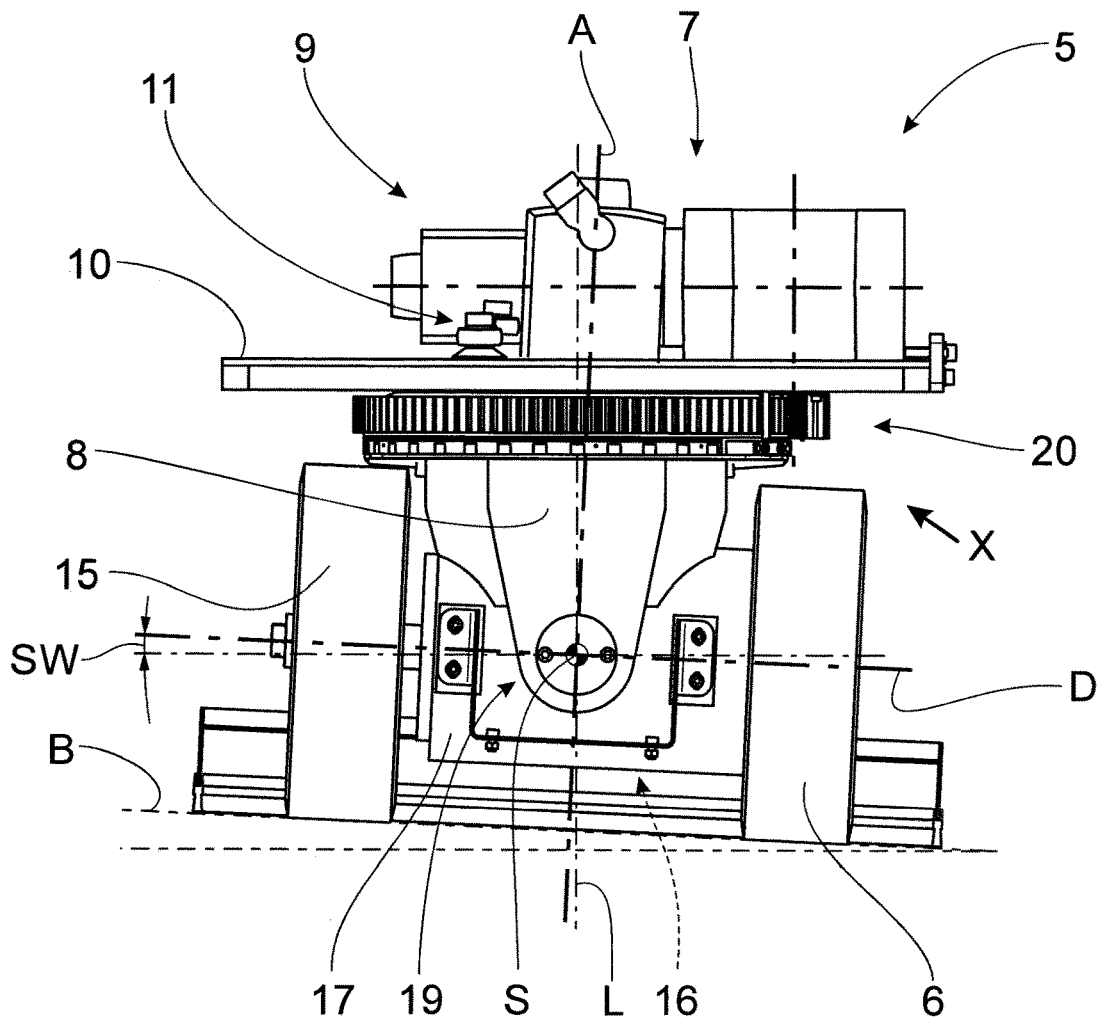
Figure 4:
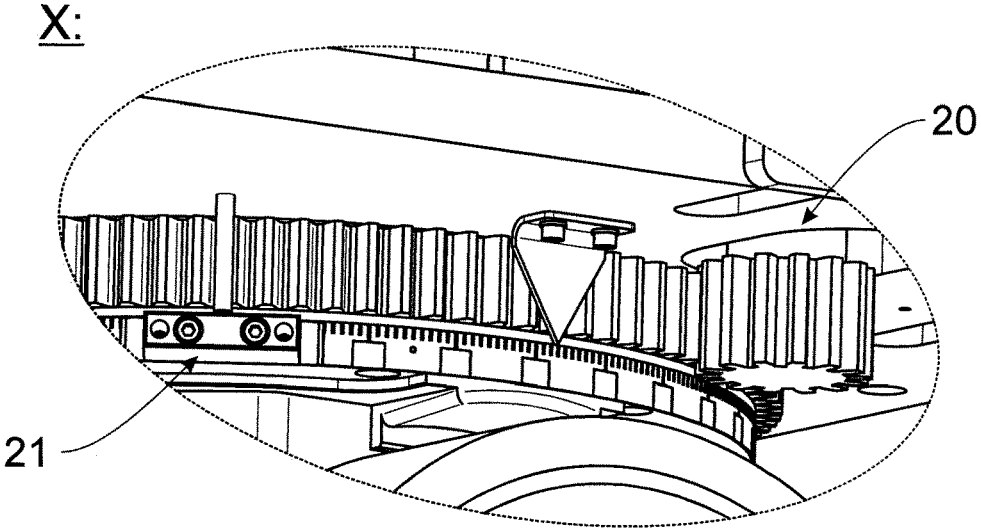

This tiltability of the rotational axis D of the drive wheel 6 has independent significance in the context of the further teaching. The tiltability is independent of the adjustability of the respective wheel carrier 8 relative to the travel drive 7 of a drive unit 5. A rotational axis D of the drive wheel 6 which is tilted relative to the vehicle 4 is shown in FIG. 4. The pivot axis S does not run parallel to the rotational axis D of the drive wheel 6. Here, the pivot axis S intersects the rotational axis D of the drive wheel 6 and/or the rotational axis D of the further wheel 15.

In addition or alternatively, it may be provided that the pivot axis S intersects the steering axis L. In the exemplary embodiment illustrated, the rotational axis D of the drive wheel 6 and the rotational axis D of the further wheel 15 (where fitted) intersect the pivot axis S and the steering axis L at one point. This applies here for each settable steering angle LW.

Furthermore, as shown in FIG. 4, the pivot axis S can run substantially orthogonally to the drive axis A and/or the steering axis L and/or the rotational axis D of the drive wheel 6 and/or the rotational axis D of the further wheel 5. The term "substantially" here, in relation to angular data, also in particular with the term "orthogonal", means a deviation of less than or equal to +/−10°, less than or equal to +/−5°, or less than or equal to +/−1° deviation.

As FIG. 4 shows, during a pivoting of the drive wheel 6 and the further wheel 15 (where fitted) about the geometric pivot axis S, the travel drive 7 is co-pivoted. As a result, loads in the drive train 17 can be reduced. In various embodiments, the steering axis L and the drive axis A of the travel drive 7 are coaxial to one another in a base position. On pivoting of the drive wheel 6 and the further wheel 15 (where fitted), the coaxiality is lost, as is shown in FIG. 5.

In the exemplary embodiment illustrated, the maximum pivot angle SW of the drive wheel 6 and the further wheel 15 (where fitted) about the geometric pivot axis S is dependent on the steering angle LW set by the steering drive 9. The maximum pivot angle SW thus changes depending on the set steering angle LW. This is achieved here by the torque lock 11. The design may be such that the maximum pivot angle SW of a drive unit 5, in particular of all drive units 5, is at its smallest when the vehicle 4 is travelling in a longitudinal direction, i.e. in the direction of the longitudinal extent of the vehicle 4, or in a transverse direction, i.e. in the direction of the transverse extent of the vehicle 4, or in a diagonal direction, i.e. not equal to the longitudinal direction or transverse direction, in particular in a direction of substantially 45° to the longitudinal direction. This is achieved here by the orientation of the torque lock 11, here the rod 12. In various embodiments, the rod 12 extends in the very direction in which the maximum pivot angle SW of the drive wheel 6 is at its smallest. In particular however, it may also be provided that the travel direction of the vehicle 4 in which the maximum pivot angle of a drive unit 5 is at its smallest differs for at least two drive discs 5, in particular all drive units 5.

The maximum pivot angle SW can be less than and or equal to 5°, further less than or equal to 3°, or further less and or equal to 2.5°.

The wheel carrier 8 has a rotational unit 8a. Furthermore, it has a pivot unit 8b which can be pivoted about the pivot axis L relative to the rotational unit. In the exemplary embodiment shown, the pivot unit 8b is formed as a pot. The further wheel 15 is arranged on the pivot unit 8b. Furthermore, the at least one gear mechanism 16 is arranged in the pivot unit 8b.

For steering, the drive unit 5 has a steering gear 20. The steering drive 9 adjusts, here rotates, the wheel carrier 8 about the steering axis L by means of the steering gear 20. In the exemplary embodiment shown, the steering gear 20 comprises a toothed gear. As FIG. 2b shows, the steering drive 9 drives a small gear wheel 20a, which in turn moves a gear wheel 20b attached to the wheel carrier 8, here the rotational unit 8a, and thus the wheel carrier 8 is adjusted about the steering axis L.

In addition or alternatively, the steering gear 20 may also be a toothed belt gear (not shown) and/or a belt gear (not shown).

Furthermore, the drive unit 5 comprises a sensor unit 21. This can be configured for determining the steering angle LW and/or for referencing a position of the wheel carrier 8 relative to the vehicle 4, in particular the mounting flange 10.

During cornering, the drive units 5 of the vehicle 4 can be actuated such that the rotational axes D of the drive wheels 6 of the different drive units 5 of the vehicle 4 intersect at a point.

In order to allow a particularly firm stance at a location of the floor-bound vehicle 4, it may be provided that the drive units 5 are also retractable relative to the vehicle 4 such that the floor-bound vehicle 4 is placed on the ground for a secure stance, in particular such that the drive wheel 6 or drive wheels no longer touch the floor.

In addition or alternatively, the floor-bound vehicle 4 may have supports 22 for raising the floor-bound vehicle 4 such that, in the raised state of the vehicle 4, the drive wheel 6 or drive wheels 6 no longer touch the ground. This variant, shown in FIG. 1a, is of particular advantage when the floor-bound vehicle 4 forms part of a movable production plant 1 according to the proposal. In this way, a quite particularly firm stance of the movable production plant 1 with a processing unit 2 for processing a workpiece 3 can be achieved. The process working forces may thereby in particular be correspondingly safely absorbed by the movable production plant 1 and conducted into the ground.

Furthermore, the vehicle 4 may have an anchoring device 23 with at least one anchor 23a. This anchoring device 23 can be configured separately from the supports 22. The anchor 23a may for example be a pin, in particular with a hemispherical head, which engages in a corresponding anchor opening 24 in the ground B. In this way, the vehicle 4 may be centered at a predefined position by engagement of the anchor 23a in the anchor opening 24, and/or can transfer processing forces to the ground B particularly safely.

In the exemplary embodiment, the processing unit 2 is arranged on the floor-bound vehicle 4. For processing the workpiece 3, the processing unit 2 has a tool unit 25, in particular a drilling and/or riveting unit. Furthermore, the processing unit 2 has a processing robot 2a which carries the tool unit 25 as an end effector. The processing robot 2a is arranged at or in particular on a height setting 2b of the processing unit 2. In this way, the working range of the processing robot 2 can be increased.

The processing robot 2 has an adjustment kinematics 2c for adjusting the tool unit 25. This can comprise at least four adjustment axes 2d, in particular at least four rotational adjustment axes. In various embodiments, the processing robot 2a has at least six or seven adjustment axes 2d, in particular rotational adjustment axes. It may for example be configured in the manner of a multiaxis articulated arm robot. In various embodiments, the adjustment kinematics 2c comprises at least six, in particular at least seven adjustment axes 2d, in particular rotational adjustment axes.

For processing by the movable production plant 1, the workpiece 3 can be held separate therefrom, in particular by a workpiece holding device 26. This workpiece holding device 26 is here arranged stationarily and may in some cases move the workpiece 3.

The production plant 1 may have a rivet store 27 for supplying the tool unit 26 with rivet elements. Furthermore, the production plant 1 may comprise a compressed air generator for supplying the processing unit, in particular the tool unit, and/or the rivet store 27, with compressed air.

Also, the floor-bound vehicle or the movable production plant 1 may have an energy store 29 for storage of in particular electrical energy for moving the vehicle 4 or production plant 1.

Finally, it is pointed out that the production plant 1 or the vehicle 4 has a controller 30 for controlling its components, in particular the drive units 5 and the processing unit 2. The controller can be an NC controller.

The invention claimed is:

1. A floor-bound vehicle for a movable production plant with a processing unit for processing a workpiece, with at least two drive units,
   wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel,
   wherein for steering, the respective wheel carrier is configured to be adjusted relative to the respective travel drive by the respective steering drive,
   wherein the respective wheel carrier has a pivot device via which the drive wheel is configured to be pivoted about a geometric pivot axis in order to compensate for unevenness in the ground and wherein during pivoting of the drive wheel about the geometric pivot axis, the travel drive is co-pivoted.

2. The floor-bound vehicle as claimed in claim 1, wherein the respective drive unit has a mounting portion via which the drive unit, as a premounted unit, is configured to be attached to the floor-bound vehicle and/or removed from the floor-bound vehicle.

3. The floor-bound vehicle as claimed in claim 1, wherein the respective travel drive is rotationally locked with respect to its geometric drive axis relative to the vehicle.

4. The floor-bound vehicle as claimed in claim 3, wherein the respective rotational locking is achieved by a movably mounted rod, for which the rod engages on the travel drive and/or a fixing of the travel drive and a point which is stationary relative to the vehicle.

5. The floor-bound vehicle as claimed in claim 1, characterized in that the respective wheel carrier with the drive wheel is adjustable by the respective steering drive about the geometric steering axis through at least 270°.

6. The floor-bound vehicle as claimed in claim 1, wherein the respective drive unit has a further wheel, wherein the further wheel is arranged on the wheel carrier and wherein for steering, the wheel carrier together with the drive wheel and the further wheel is adjustable by the steering drive about the steering axis.

7. The floor-bound vehicle as claimed in claim 6, wherein the rotational axis of the drive wheel and the rotational axis of the further wheel are coaxial to one another.

8. The floor-bound vehicle as claimed in claim 1, wherein the respective drive unit has at least one gear mechanism, which is arranged in a drive train from the travel drive to the drive wheel and transmits the drive power of the travel drive to the drive wheel.

9. The floor-bound vehicle as claimed in claim 8, wherein an input shaft of a respective gear is arranged coaxially to the drive shaft of the travel drive, and an output shaft of the respective gear is arranged coaxially to the rotational axis of the drive wheel.

10. The floor-bound vehicle as claimed in claim 1, wherein the respective wheel carrier has the pivot device via which the drive wheel and the further wheel is configured to be pivoted about a geometric pivot axis in order to compensate for unevenness in the ground.

11. The floor-bound vehicle as claimed in claim 1, wherein during pivoting of the drive wheel and the further wheel about the geometric pivot axis, the steering drive is not co-pivoted.

12. The floor-bound vehicle as claimed in claim 1, wherein a maximum pivot angle of the drive wheel about the geometric pivot axis is dependent on the steering angle set by the steering drive.

13. The floor-bound vehicle as claimed in claim 1, wherein the drive unit has a steering gear, and the steering drive adjusts the wheel carrier about the steering axis via the steering gear.

14. The floor-bound vehicle as claimed in claim 1, wherein the floor-bound vehicle is controlled automatically and guided contactlessly.

15. A movable production plant for processing a workpiece, in particular a structural aircraft component,
wherein the production plant has a floor-bound vehicle as claimed in claim 14 and a processing unit for processing the workpiece and assigned to the vehicle, wherein the processing unit for processing the workpiece has a tool unit.

16. The movable production plant as claimed in claim 15, characterized in that the processing unit has a processing robot which carries the tool unit as the end effector.

17. The floor-bound vehicle as claimed in claim 1, wherein the drive units are also retractable relative to the vehicle, such that the floor-bound vehicle is placed on the ground for a secure stance, and the drive wheel or drive wheels no longer touches or touch the ground, and/or the floor-bound vehicle has supports for raising the floor-bound vehicle such that, in raised state of the vehicle, the drive wheel or drive wheels no longer touches or touch the ground.

18. A floor-bound vehicle for a movable production plant with a processing unit for processing a workpiece, with at least two drive units,
wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel,
wherein a rotational axis of the drive wheel is tiltable relative to the vehicle,
wherein the respective wheel carrier has a pivot device via which the drive wheel is configured to be pivoted about a geometric pivot axis in order to compensate for unevenness in the ground and wherein during pivoting of the drive wheel about the geometric pivot axis, the travel drive is co-pivoted.

19. The floor-bound vehicle as claimed in claim 18, wherein the respective drive unit has a mounting portion via which the drive unit, as a premounted unit, is configured to be attached to the floor-bound vehicle and/or removed from the floor-bound vehicle.

20. The floor-bound vehicle as claimed in claim 1, wherein the respective wheel carrier with the drive wheel is adjustable by the respective steering drive about the geometric steering axis freely.

21. A floor-bound vehicle for a movable production plant with a processing unit for processing a workpiece, with at least two drive units,
wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel,
wherein for steering, the respective wheel carrier is configured to be adjusted relative to the respective travel drive by the respective steering drive,
wherein the maximum pivot angle of the drive wheel about the geometric pivot axis is dependent on the steering angle set by the steering drive.

22. A floor-bound vehicle for a movable production plant with a processing unit for processing a workpiece, with at least two drive units,
wherein the drive units each comprise at least one drive wheel, a travel drive for driving the at least one drive wheel, a wheel carrier on which the at least one drive wheel is arranged, and a steering drive for adjusting the wheel carrier with the drive wheel about a geometric steering axis and thus steering the drive wheel,
wherein for steering, the respective wheel carrier is configured to be adjusted relative to the respective travel drive by the respective steering drive,
wherein the respective travel drive is rotationally locked with respect to its geometric drive axis relative to the vehicle,
wherein the respective rotational locking is achieved by a movably mounted rod, for which the rod engages on the travel drive and/or a fixing of the travel drive and a point which is stationary relative to the vehicle.

* * * * *